Figure 3:
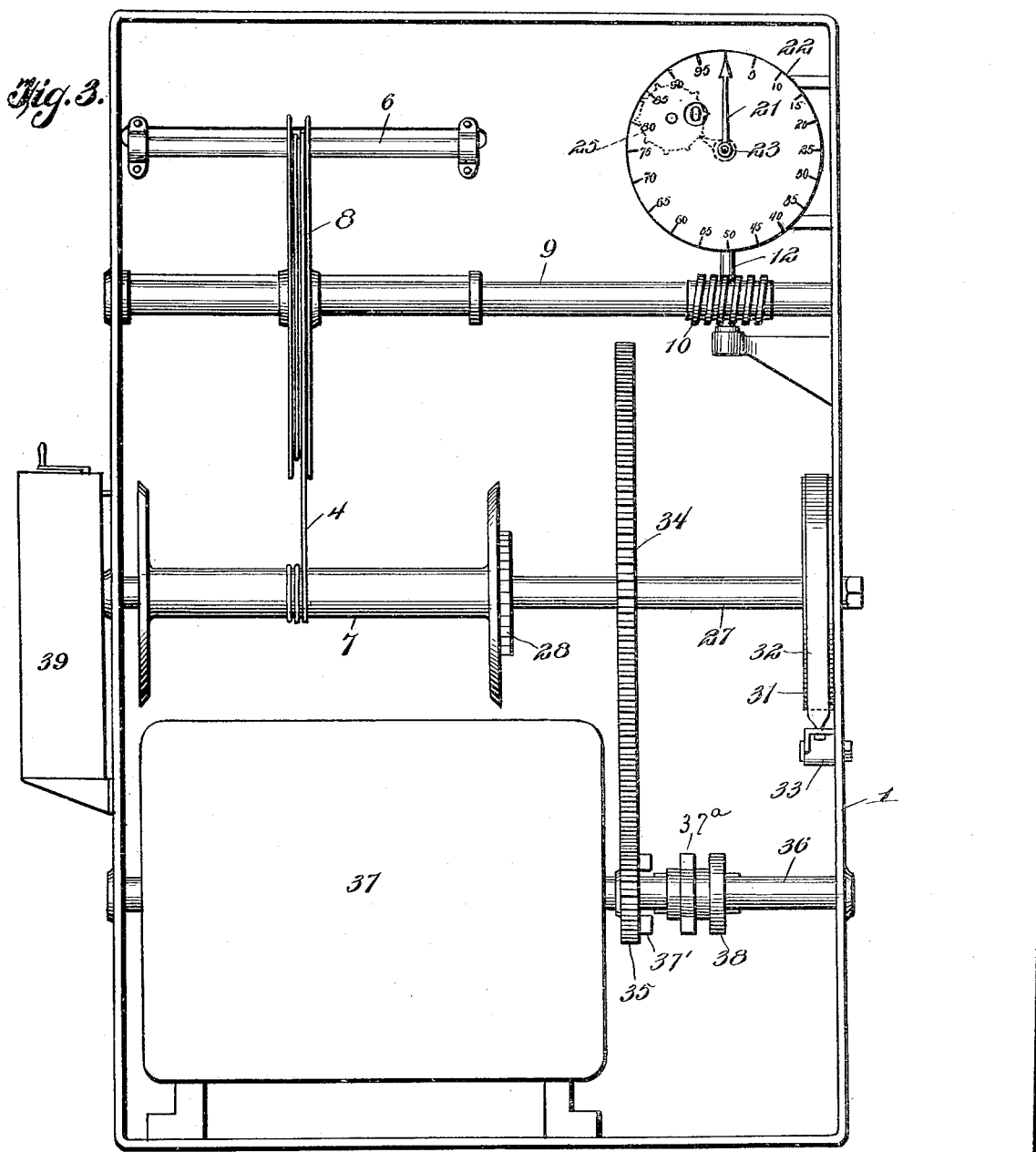

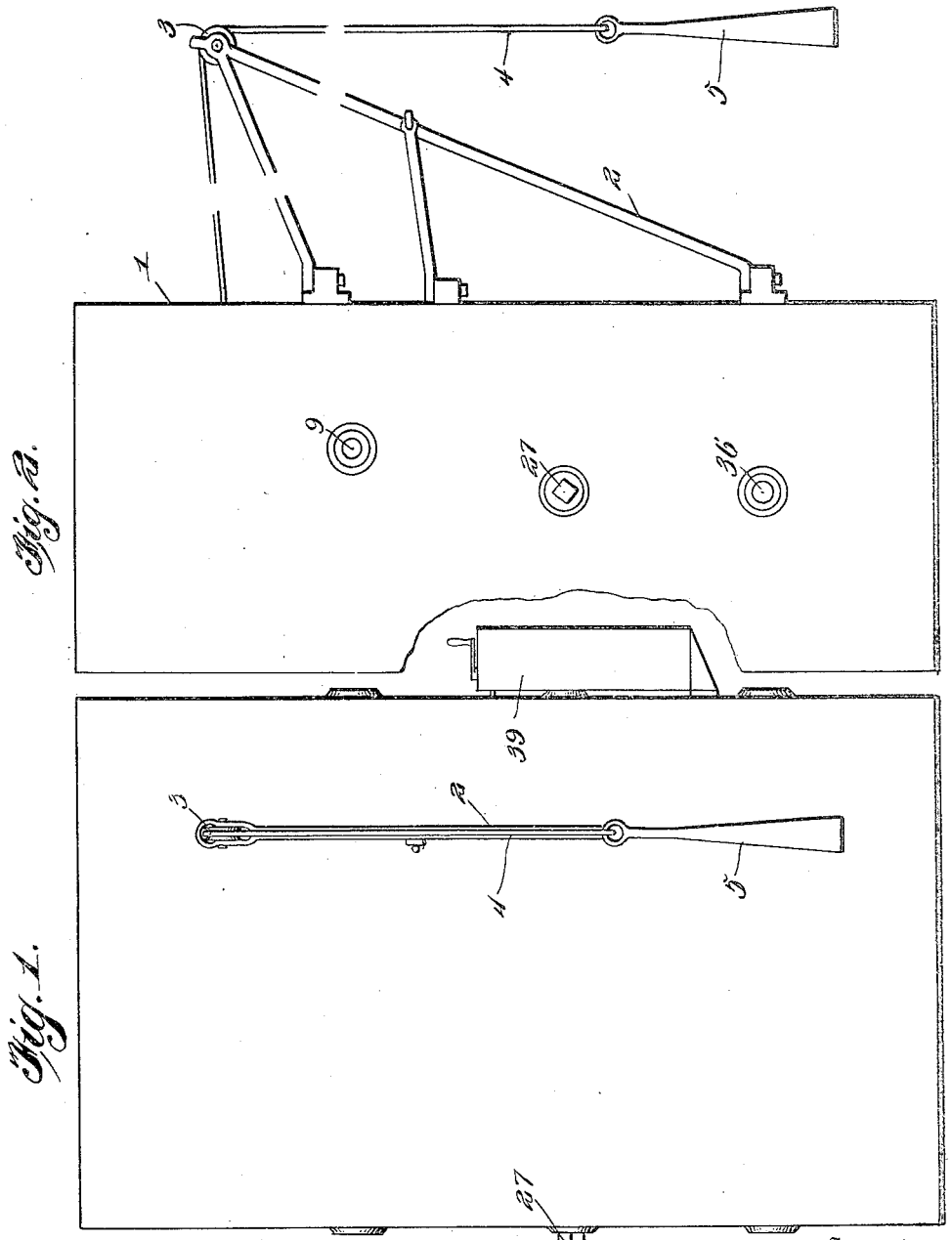

T. B. MURRAY.
DEPTH SOUNDING APPARATUS.
APPLICATION FILED NOV. 11, 1913.

1,126,554.

Patented Jan. 26, 1915.

3 SHEETS—SHEET 2.

Witnesses
J. R. Heinrichs
V. B. Hillyard.

Inventor
Thomas B. Murray
By Victor J. Evans
Attorney

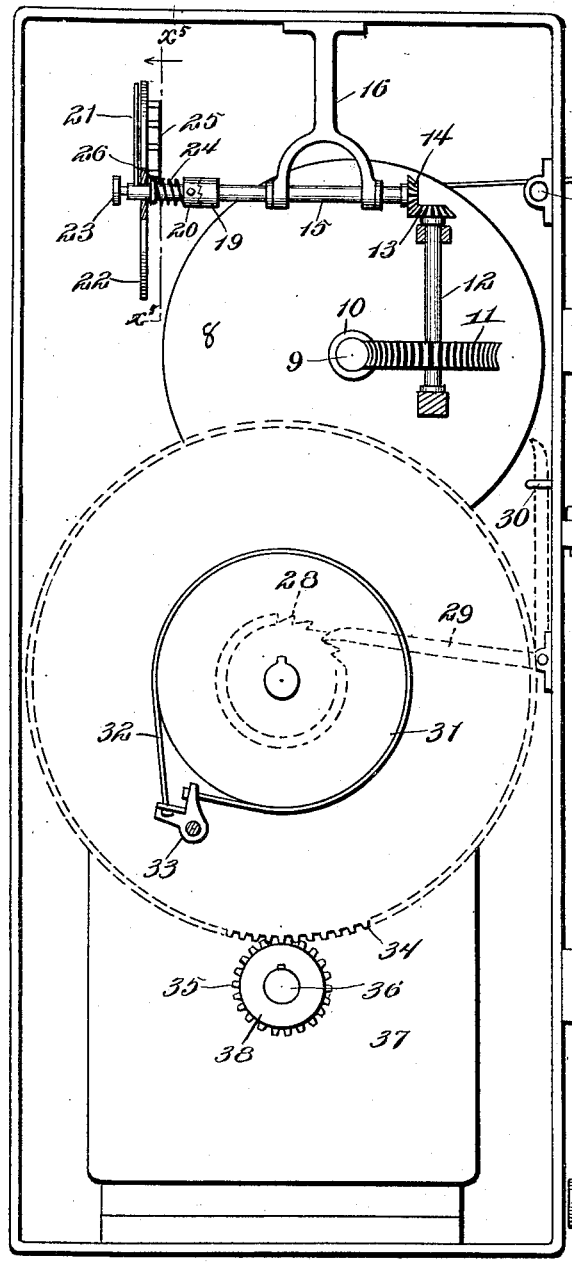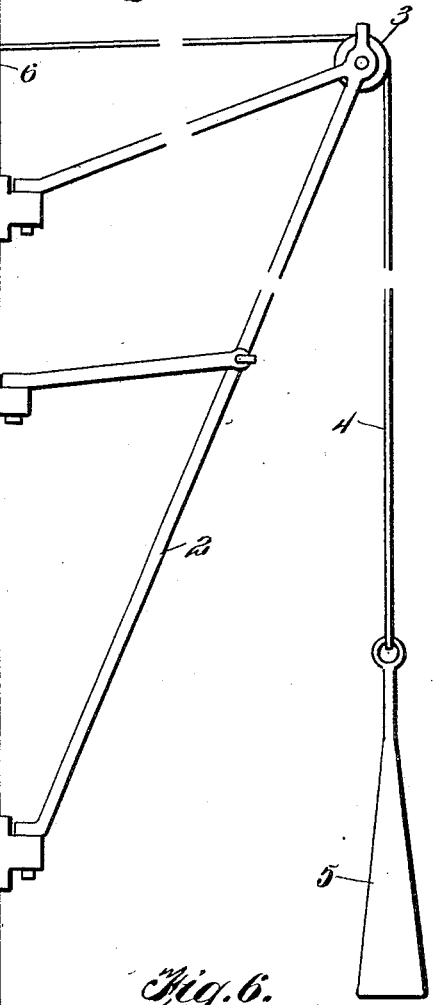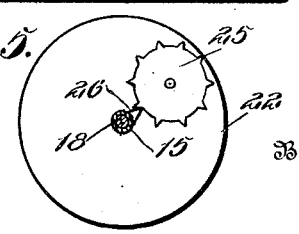

UNITED STATES PATENT OFFICE.

THOMAS B. MURRAY, OF CAMDEN, NEW JERSEY.

DEPTH-SOUNDING APPARATUS.

1,126,554.  Specification of Letters Patent.  Patented Jan. 26, 1915.

Application filed November 11, 1913. Serial No. 800,342.

*To all whom it may concern:*

Be it known that I, THOMAS B. MURRAY, a citizen of the United States, residing at Camden, in the county of Camden and State of New Jersey, have invented new and useful Improvements in Depth-Sounding Apparatus, of which the following is a specification.

The invention relates to indicating mechanism for determining the depth of navigable bodies of water when it is required to take soundings to prevent the foundering of vessels, the purpose being the provision of a mechanism which will admit of soundings being quickly ascertained and which under certain conditions is of great importance to prevent the foundering of a ship by running upon shoals, bars or the like.

The invention provides a mechanism embodying an indicator, a drum, a weighted line, and actuating means operated by the weighted line for moving the indicating mechanism to determine the depth of the sounding, the means for transmitting movement to the indicator embodying a clutch which automatically throws the indicating mechanism out of action when rewinding the weighted line, the indicating mechanism being adapted to be set to zero by hand at any time after the weighted line has been reeled.

The invention consists of the novel features, details of construction and combination of parts, which hereinafter will be more particularly set forth, illustrated in the accompanying drawing, and pointed out in the appended claims.

Figure 1 is a front view of a mechanism for indicating soundings embodying the invention. Fig. 2 is a side view thereof. Fig. 3 is a rear view having the back of the casing omitted. Fig. 4 is a side view having the near side of the casing removed. Fig. 5 is a section on the line $x^5$—$x^5$ of Fig. 4 looking in the direction of the arrow. Fig. 6 is a detail view of the indicating mechanism showing more clearly the clutch and parts coöperating therewith, the parts being shown on a larger scale.

Corresponding and like parts are referred to in the following description, and indicated in all the views of the drawing, by the same reference characters.

The working parts of the mechanism are inclosed within a casing 1 which may be of any construction. A bracket 2 partaking of the nature of a crane is connected to a side of the casing 1 and is provided with a guide pulley 3 over which the sounding line 4 passes, said line being provided with the usual weight 5 which may be of any mass depending upon the nature of the vessel for which the sounding mechanism is designed. A guide roller 6 is located within the casing 1 opposite a horizontal opening formed therein and receives the sounding line 4 which passes thereover. A drum 7 is located within the casing and has one end of the sounding line 4 attached thereto. The sounding line is adapted to wind upon the drum 7 and is given a turn around a pulley 8 which is splined to a horizontal shaft 9. The pulley 8 is grooved in the outer edge to receive the sounding line 4 so as to retain the same in place. The sounding line is given one or more turns about the pulley 8 to prevent possible slipping thereby insuring positive rotation of the pulley when the sounding line is running off the drum 7 as when taking a sounding. The pulley 8 slides on the shaft 9 thereby insuring a smooth and uniform winding of the sounding line upon the drum 7. A worm 10 is formed with or otherwise provided upon the shaft 9 so as to rotate therewith and is in mesh with a worm wheel 11 secured to a vertical shaft 12. A beveled gear 13 fastened to the upper end of the shaft 12 is in mesh with a beveled gear 14 secured to a horizontal shaft 15 and is mounted in a bracket 16 and restrained from longitudinal movement. The outer portion of the shaft 15 has an opening 17, Fig. 6, formed therein and receives a shaft 18. A clutch connects the shafts 15 and 18 and comprises the members 19 and 20. The member or half clutch 19 is secured to the shaft 15 and the member or half clutch 20 is fast to the shaft 18. On the forward rotation of the shaft 15 as when the sounding line is running off the drum 7 the clutch members 19 and 20 are in engagement with the result that the indicating mechanism is operated but upon the backward rotation of the shaft 15 to rewind the line on the drum 7 the clutch members 19 and 20 ride one upon the other thereby preventing operation of the indicating mechanism. A hand or pointer 21 is secured to the outer end of the shaft 18 and travels over a dial 22 which is relatively fixed and properly graduated to indicate the fathoms of the sounding line running off from the drum 7 when taking the sounding. The dial 22 is fixed and may be secured to the casing in any manner. A knob 23 is provided at the outer end of the shaft 18 to be grasped when it is required to separate the clutch to enable the indicating mechanism to be set or returned to zero preliminary to the next operation of the mechanism for taking a sounding. A spring 24 normally exerts a pressure to hold the members 19 and 20 in engagement. One face of the teeth between the clutch members 19 and 20 is inclined so that upon the backward rotation of the shaft 15 the teeth of the clutch member 20 will ride upon the clutch member 19 and thereby prevent reverse movement of the indicating mechanism. A small dial 25 is mounted upon the main dial 22 and the markings thereon are readable through an opening in the dial 22. The dial 25 is operated once for every complete revolution of the hand or pointer 21 so that it may be readily ascertained how many times the hand or pointer 21 has made a complete revolution when taking a sounding. A projection 28, Fig. 5, is rotatable with the shaft 18 and at every complete revolution of the shaft 18 and pointer 21 it engages the dial 25 and causes the same to move forward a distance to bring the next marking or indexing in position to be read through the opening of the dial 22.

The drum 7 is rotatable with a shaft 27 and is provided at one end with ratchet teeth 28 to be engaged by means of a pawl 29 to prevent backward rotation of the drum from any cause. When the sounding line is running off the drum 7 the pawl 29 is thrown upward to clear the ratchet teeth 28 and is held out of the way by means of a clamp 30. A brake wheel 31 is secured to an end portion of the shaft 27 and a brake band 32 is is arranged to coöperate therewith. The ends of the brake band 32 are connected with an element which is adapted to be turned to contract the brake band and cause the same to grip the brake wheel 31. The brake is brought into play the instant the weight of the sounding line strikes the bottom so as to prevent any slack of the sounding line which would tend to cause the same to slip from the pulley 8. A gear wheel 34 fastened to the shaft 27 is in mesh with a gear wheel 35 of less diameter loose upon the shaft 36 of a motor 37. A clutch key 37' upon one side of the gear wheel 35 is adapted to be engaged by companion clutch teeth 37ª at one end of a sleeve 38 splined upon the motor shaft 36. When the sounding line is running off the drum 7 the clutch sleeve 38 is moved outward and the pawl 29 is thrown upward out of the way. When rewinding the sounding line on the drum 7 the sleeve 38 is moved to throw the gear wheel 35 into clutched engagement with the motor shaft 36 with the result that the shaft 27 is rotated to wind the sounding line upon the drum 7 when the motor 37 is in operation. While the motor 37 may be of any variety it is preferred to employ one of the electric type in which case a controller 39 of ordinary construction is employed to regulate the current by means of which the motor 37 is actuated.

When the mechanism is in position it is preferably located at the stern of a vessel and may be lashed to the railing or other convenient part of the ship. It is to be understood that the casing is such as to house the parts and to protect the same from the elements and dampness. The several shafts are mounted in a substantial way so as to resist wear and minimize friction. As indicated the casing is reinforced at points corresponding with the bearings and such reinforcements are provided with bushings to receive the direct wear and thrust. The weight 5 at the end of the sounding line is held elevated by the pawl 29 engaging the ratchet teeth 28. The bracket 2 by reason of its mounting so as to swing horizontally, automatically adapts itself to the line of strain of the sounding line as the same is running off the drum 7. When the weight strikes the bottom when taking the sounding the brake is instantly applied by hand after which the clutch is thrown into engagement to rewind the line upon the drum 7. During the operation of the motor the brake is released and the hand or pointer 21 remains stationary by reason of the teeth of the clutch member 20 riding upon the teeth of the clutch member 19. After the sounding line has been rewound upon the drum 7 the pawl 29 is thrown into engagement with the ratchet teeth 28 to prevent unwinding of the sounding line. After the reading has been noted the knob 23 is grasped and the shaft 18 moved so as to cause the teeth of the clutch member 20 to clear the teeth of the clutch member 19 after which the shaft 18 is turned to bring the hand 21 to zero. It is to be understood that the dial 25 is likewise returned to zero or the starting point by hand.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims appended hereto.

Having thus described the invention what is claimed as new, is:—

1. In mechanism for taking soundings, the combination of an indicating mechanism, a sounding line, a pulley having the sounding line passing therearound, and driven thereby, a shaft having the said pulley splined thereon, a second shaft connected with the pulley supporting shaft and driven thereby, and a clutch between the said second shaft and the before mentioned indicating mechanism to cause operation of the latter when the sounding line is running out and to automatically throw the indicating mechanism out of action when the sounding line is rewound.

2. In a mechanism for taking soundings, the combination of a shaft provided with a drum, a brake arranged in conjunction with such shaft, a motor having a shaft connecting means between the shaft of the motor and the shaft provided with the drum, indicating mechanism, a shaft for operating the indicating mechanism, a clutch between such shaft and indicating mechanism, a pulley splined upon the last mentioned shaft and grooved in its outer edge and a sounding line adapted to wind upon the drum and passing around the grooved pulley.

In testimony whereof I affix my signature in presence of two witnesses.

THOMAS B. MURRAY.

Witnesses:
JAS. J. GANLY,
JOHN LONGSTREET.

Copies of this patent may be obtained for five cents each, by addressing the "Commissioner of Patents, Washington, D. C."